US008145772B2

(12) United States Patent
Kowalewski (10) Patent No.: US 8,145,772 B2
(45) Date of Patent: Mar. 27, 2012

(54) METHOD FOR SENDING DATA, AND COMMUNICATION DEVICE

(75) Inventor: Frank Kowalewski, Unterhaching (DE)

(73) Assignee: Intel Mobile Communications GmbH, Neubiberg (DE)

( * ) Notice: Subject to any disclaimer, the term of this patent is extended or adjusted under 35 U.S.C. 154(b) by 206 days.

(21) Appl. No.: 12/535,708

(22) Filed: Aug. 5, 2009

(65) Prior Publication Data

US 2010/0036960 A1 Feb. 11, 2010

(30) Foreign Application Priority Data

Aug. 5, 2008 (DE) .................... 10 2008 036 453

(51) Int. Cl.
*G06F 15/16* (2006.01)

(52) U.S. Cl. ........ 709/228; 709/208; 709/209; 709/203; 709/221; 358/1.16; 358/1.13; 370/419; 711/144; 711/141; 711/143; 711/113

(58) Field of Classification Search .................. 709/228, 709/208, 203, 221, 209, 223, 224
See application file for complete search history.

(56) References Cited

U.S. PATENT DOCUMENTS

| | | | | |
|---|---|---|---|---|
| 6,810,405 B1 * | 10/2004 | LaRue et al. | ................. | 707/613 |
| 2004/0237045 A1 * | 11/2004 | Meltzer | ........................ | 715/530 |
| 2005/0071839 A1 * | 3/2005 | Kim et al. | ..................... | 717/170 |
| 2006/0234613 A1 | 10/2006 | Hans et al. | | |
| 2007/0067373 A1 * | 3/2007 | Higgins et al. | ................ | 707/206 |
| 2011/0044243 A1 * | 2/2011 | Yi et al. | ........................ | 370/328 |

FOREIGN PATENT DOCUMENTS

DE 102005002803 B3 8/2006

OTHER PUBLICATIONS

Norm ITU-T Recommendation X.25, Telecommunication Standardization Sector of ITU, Series X: Data Networks and Open System Communication, Interface between Data Terminal, Wquipment (DTE) and Data Circuit-terminating, Equipment (DTE) for Terminals Operating in the Packet Mode and Connected to Public Data Networks by Dedicated Circuit, (Oct. 1996) pp. 26-29.
Kozierok, Charles: The TCP/IP guide: a comprehensive, illustrated Internet protocols reference, San Francisco, No Starch Press, Inc, 2005, S. 780-788.—ISBN 1-59327-047-X.

* cited by examiner

*Primary Examiner* — Jude Jean Gilles (57) ABSTRACT

The application describes a method for sending data which involves the reception by a communication device of a first piece of information which represents the first change in a data record and of a first data change indicator associated with the first change in the data record, making by the communication device of a second change in the first changed data record to generate a second changed data record, the ascertainment by the communication device of a second data change indicator based on the first data change indicator, and sending by the communication device of a second piece of information which represents the second change in the first changed data record to produce the second changed data record, and of the second data change indicator.

28 Claims, 8 Drawing Sheets

METHOD FOR SENDING DATA, AND COMMUNICATION DEVICE

RELATED APPLICATIONS

The present application claims priority from German application No. 10 2008 036 453.3 filed on Aug. 5, 2008.

TECHNICAL FIELD

Various embodiments relate to a method for sending data and to a communication device.

BACKGROUND

For applications in which a plurality of communication appliances are involved, the case may arise that all communication appliances involved are intended to have the same version of a data record, that is to say that the data record is intended to be synchronized between the communication appliances involved. There is then a demand for methods for synchronization which operate efficiently in respect of the volume of data required for the synchronization but also reliably, for example when synchronization messages have been lost.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which.

DESCRIPTION

The following detailed description refers to the accompanying drawings that show, by way of illustration, specific details and embodiments in which the invention may be practiced. These embodiments are described in sufficient detail to enable those skilled in the art to practice the invention. Other embodiments may be utilized and structural, logical, and electrical changes may be made without departing from the scope of the invention. The various embodiments are not necessarily mutually exclusive, as some embodiments can be combined with one or more other embodiments to form new embodiments.

The word "exemplary" is used herein to mean "serving as an example, instance, or illustration". Any embodiment or design described herein as "exemplary" is not necessarily to be construed as preferred or advantageous over other embodiments or designs.

Various embodiments provide a possibility for data synchronization between communication appliances which is efficient in respect of the required data transmission complexity and is robust in the face of transmission errors.

Within the framework of this description, the terms "connected" and "coupled" are used to describe both a direct and an indirect connection and a direct or indirect coupling. In the figures, identical or similar elements are provided with identical reference symbols as far as this is expedient.

For a multiplicity of communication applications, it is necessary for the communication appliances involved in a respective communication application to be able to alter shared data records and to be informed about the current status of the shared data records.

Examples of such communication applications are:

Games for which the current state (game state), for example the state of the gaming world, is intended to be known to all communication appliances involved.

Address books for which address entries with the same status are intended to be present on various communication terminals and/or server computers.

Data distribution applications for which applications and/or updates or documents and document changes are intended to be distributed among a plurality of communication appliances, so that the communication appliances have the same versions of the applications or of the documents.

Group message services for which all messages are intended to be available to all group members.

Communication rights request queues (which are referred to as floor queues), for which both a communication rights server and terminals involved in a communication are intended to know the current status of the queue.

In this context, a shared data record (or a data record which is to be synchronized) for two (or similarly a plurality of) communication devices (e.g. communication appliances) may be understood to mean a data record for which both communication devices contain an instance, both instances being intended to have the same status. Accordingly, if the instance of the data record in one of the communication devices is changed, the instance of the data record in the other communication device is accordingly changed (within a sufficiently short time interval for the respective application), that is to say that the instances of the data record are synchronized or in other words the communication devices are synchronized in respect of the data record. In this context, the two instances of the data record form a single (shared or logical) data record which has an explicit status (apart from differences which may be present within the time interval in which the synchronization takes place; that is to say that a difference is present for no more than the duration of the time interval).

By way of example, two communication appliances can synchronize a data record by virtue of one of the communication appliances sending the other communication appliance data which it has changed. For the purpose of synchronization between the two communication appliances, the communication appliance which has changed the data can send all of the changed data or just pieces of information which specify the changes in the data.

To avoid problems for the case in which a communication appliance has not been notified of a data change, for example on account of a transmission error in an unreliable communication link, the procedure used may be such that data which are to be synchronized are synchronized with periodic repetition.

To avoid unnecessary transmission of changed data or pieces of information which specify a change in data in this case, for example, the status of a data record (version of the data record) can be characterized by means of an identifier. Prior to the transmission of the current version of the data record (or information which specifies the change in the data record in comparison with a previous version), it is possible for the identifier of the current data record to be compared with the identifier of the version of the data record which is available to the communication appliance which is intended to be informed about the current status of the data record (that is to say the instance of the data record on the communication appliance). The current data record (or the information which specifies the change in the data record in comparison with a previous version of the data record) is then transmitted only if the identifiers differ, for example.

Such an identifier of a data record in a particular version can be ascertained on the basis of the data to be identified using a cryptographic algorithm (for example a hash function), for example.

Changes in a data record which are made by a communication appliance can also be numbered serially by the communication appliance. By way of example, the communication appliance then sends the data change number of the last change and its own address to other communication appliances which are intended to be informed about the current version of the data record. This is done periodically, for example. If one of the other communication appliances establishes that it has not received a changed data record or information specifying the change in the data record for a received change number, it requests the current data record or information about the change in the data record in comparison with a previous version, for example, from the communication appliance.

The use of communication-appliance-specific data change numbers typically requires all communication appliances involved to be connected to all other communication appliances involved, i.e. that all communication appliances to be synchronized (in respect of the data record) are coupled by means of communication links. By way of example, this case requires that the communication appliances be connected directly and that no communication network having indirect communication links be used.

By sending information which specifies the change in a data record in comparison with an earlier version, the volume of data required for synchronization can be reduced in comparison with the transmission of the complete changed data record. By way of example, the procedure may be such that although the whole data record is very comprehensive, the change relates only to a small portion of the data record.

The use of a data record identifier derived from a data record for identifying the various versions of the data record is typically suitable only if, in line with a data record which is held by a master communication appliance, the instances of the data record on other communication appliances need to be adjusted, that is to say the communication appliances need to be synchronized with the master communication appliance in respect of the data record. In this case, the change in the data record via the other communication appliances is typically not made possible.

The possibilities described above typically require the regular (for example periodic) interchange of identifiers of data records or data change numbers between the communication appliances involved.

Figure 1:
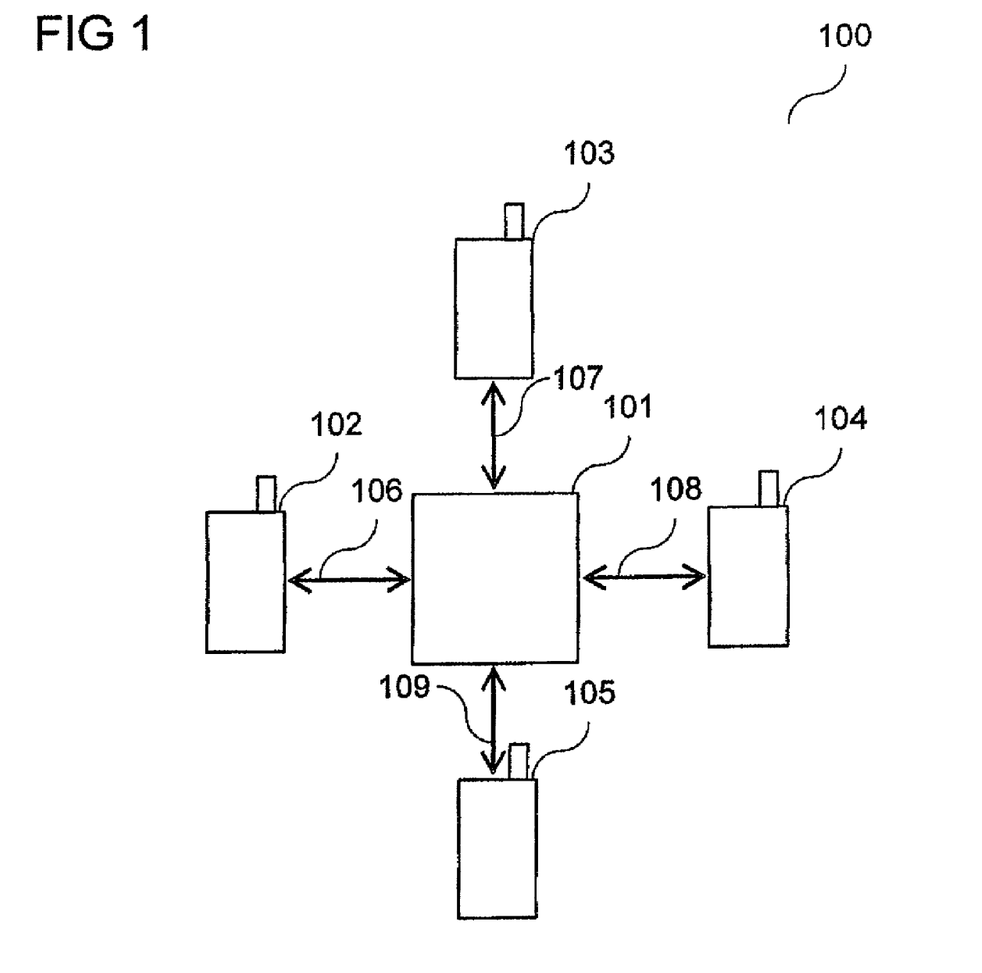
FIG. 1 shows the communication arrangement in accordance with an embodiment.

FIG. 1 shows a communication arrangement 100 based in accordance with an embodiment.

A first communication device 101 is coupled to a second communication device 102 by means of a first communication link 106. In addition, the first communication device 101 is coupled to a third communication device 103 by means of a second communication link 107, to a fourth communication device 104 by means of a third communication link 108 and to a fifth communication device 105 by means of a fourth communication link 109.

By way of example, a communication device 101 to 105 is a communication device, for example a communication terminal device such as a mobile radio subscriber device or a personal computer, or else a component of a communication network, e.g. of a mobile radio communication network, such as a server computer.

It is assumed that at least two of the communication devices 101 to 105 are involved in an application which requires data, for example a data record, to be synchronized between the communication devices 101 to 105, i.e. if one of the communication devices 101 to 105, for example, changes the data then the other communication device 101 to 105 (or the other communication devices 101 to 105) is informed about the change, for example by virtue of the changed data being sent to the other communication device 101 to 105 or information about the change in the data in comparison with a previous version, for example with the last version communicated to the communication device 101 to 105, being transmitted to the communication device 101 to 105.

In one embodiment, data are synchronized between the communication devices 101 to 105 by virtue of one communication device 101 to 105, when making a data change, identifying the data change by means of a data change number (or a data change indicator, for example a data change value) which on the basis of at least one data change number which it selects from one of the other communication devices 101 to 105 in connection with a (previous) change in the data which was made by the other communication device 101 to 105.

By way of example, a communication device 101 to 105 which makes changes on the data (which are to be synchronized) identifies the change by means of a (new) data change number which it selects on the basis of the highest data change number selected by itself or received from another communication device 101 to 105 in connection with the synchronization of the data. By way of example, the number which follows this highest data change number (next number) is selected as the new data change number to be used for identifying the change in the data. The next data change number used is the previously highest data change number increased by one, for example.

If one of the communication devices 101 to 105 makes a data change, it sends a statement of the data change (in the form of information which specifies the change), for example, together with the data change number which is associated with the data change and which the communication device 101 to 105 has selected for the data change, and in one embodiment together with an address for the communication device 101 to 105, to the other communication device 101 to 105 (or the other communication devices 101 to 105). A communication device 101 to 105 to which a data change statement is sent in this way stores the data changed number associated with the data change as the last received data change number and, in one embodiment, additionally the address of the communication device 101 to 105 which has made the data change.

If, in one embodiment, a communication device 101 to 105 determines that a received data change statement is associated with a data change which has an associated data change number before which the highest data change number which the receiving communication device 101 to 105 has stored continues to be situated as direct, i.e. the data change number associated with the data change is not the next number to the stored data change number associated with the last change known to the receiving communication device, the receiving communication device 101 to 105 communicates the stored data change number to the communication device 101 to 105 which has made the (current) change. The communication device 101 to 105 which has made the change then sends the receiving communication device 101 to 105, for example, statements about data changes which have been made between the data change with which the data change number stored in the receiving communication device 101 to 105 is associated and the current data change, for example statements about all such intermediate data changes.

If any data change statements are transmitted for the purpose of synchronization, i.e. only information about the change in the data in comparison with a previous version of the data, as is provided in one embodiment, then the volume of data for synchronization is smaller than if complete changed data records are transmitted for the purpose of synchronization.

An embodiment allows the data which are intended to be synchronized between all communication devices 101 to 105 involved to be able to be altered by all communication devices 101 to 105 involved.

An embodiment allows the communication devices 101 to 105 to be able to be connected to one another in line with any network topology. By way of example, an embodiment allows the communication devices 101 to 105 to communicate with one another to some extent only indirectly using other instances of the communication devices 101 to 105.

Various embodiments require only little signaling for the purpose of synchronizing the data. By way of example, one embodiment does not require data transmissions or signaling transmissions to be performed regularly (e.g. periodically). Various embodiments can also be used for unsafe (e.g. in respect of the rate at which messages are lost) or unreliable communication links between the communication devices 101 to 105. By way of example, various embodiments are thus robust toward transmission errors, e.g. in the form of untransmitted messages.

Figure 2:
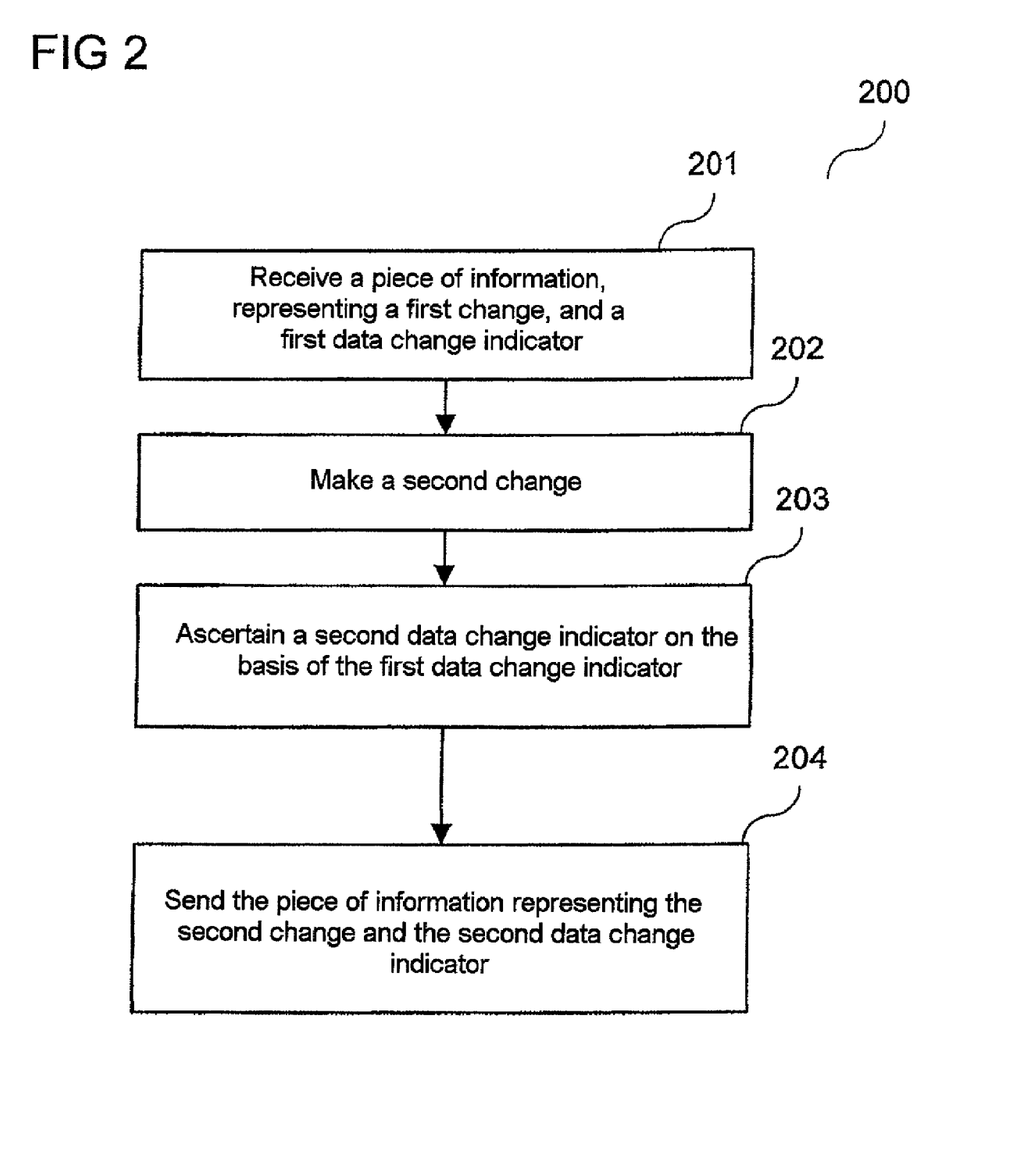
FIG. 2 shows a flowchart in accordance with an embodiment.

In line with an embodiment, a communication device 101 to 105 performs the method shown in FIG. 2 in order to send data (e.g. a data record which is to be synchronized between the communication device and another communication device).

FIG. 2 shows a flowchart 200 in accordance with an embodiment.

In 201, a first piece of information, which represents a first change in a data record to generate a first changed data record, and a first data change indicator associated with the first change in the data record are received.

In 202, a second change in the first changed data record to generate a second changed data record is made.

In 203, a second data change indicator is ascertained on the basis of the first data change indicator.

In 204, a second piece of information, which represents the second change in the first data record to generate the second changed data record, and the second data change indicator are sent.

The second data change indicator is assigned or allocated, for example, to the second piece of information.

As a good example, in an embodiment all changes made on a data record are numbered serially, each change being assigned a dedicated number (e.g. a counter value), wherein the counter value associated with a change is based on the counter value of the previous change. By way of example, counter values which are incremented (cyclically) are used for identifying the changes. Changes can be made to the data record by a plurality of communication devices. When a plurality of communication devices make changes, a shared counter is used for the changes in as much as a communication device receiving the statement of a change from another communication device stipulates the data change indicator, which it assigns to a change that it itself has made, taking account of the data change indicator of the change for which it has received the statement. As a good example, a logical counter is therefore provided which, by way of example, can assume elements of a predefined numerical sequence or a sequence of identifications and which is used by all communication devices involved for the purpose of serially numbering the changes or for the purpose of explicitly (apart from the cyclic recurrence of numbers/identifications, for example) identifying the changes.

The first piece of information is the first changed data record, for example. The second piece of information is the second changed data record, for example.

By way of example, the first data change indicator and the second data change indicator are counter values from a sequence of counter values, and the second data change indicator is the counter value which follows the first data change indicator.

The second data change indicator is ascertained from the first data change indicator, for example, by means of an arithmetic operation. By way of example, the first data change indicator and the second data change indicator are integer numbers and the second data change indicator is the first data change indicator increased by a prescribed value (e.g. by one).

In an embodiment, the first piece of information sent by a communication device and the first data change indicator are received and the second piece of information and the second data change indicator are sent to the communication device.

In an embodiment, the data record has a plurality of data elements and it is ascertained which data elements in the second changed data record have changed in comparison with the first changed data record, and for each changed data element a data element change statement which specifies the change in the changed data element is generated as part of the second piece of information.

In an embodiment, the second data change indicator is stored as the data change indicator associated with the last change in the data record.

In an embodiment, the first data change indicator is compared with a stored data change indicator associated with the last change in the data record, and it is ascertained, on the basis of the comparison result, whether a stored instance of the data record contains the first change in the data record.

In an embodiment, an identification, associated with the first change in the data record, for a communication device (for example the communication device which has made the first change in the data record) is received and it is ascertained, on the basis of the received identification, whether a stored instance of the data record contains the first change in the data record. By way of example, the identification is an address for the communication device, for example an address within the context of the application for which the data record is used.

In one embodiment, an identification associated with the communication device which makes the second change is assigned to the second piece of information and the identification is sent.

By way of example, a stored instance of the data record is changed in line with the first change in the data record and in line with the second change in the data record.

In an embodiment, the first data change indicator is compared with a stored data change indicator associated with the last change in the data record and it is ascertained, on the basis of the comparison result, whether a stored instance of the data record contains a (for example any) change in the data record which preceded the first change in the data record. By way of example, a check is performed to determine whether the stored instance does not contain any change which preceded the first change in the data record (provided that it has not been reversed again).

By way of example, if the stored instance of the data record does not contain the change in the data record which preceded the first change in the data record then a piece of information which represents a change in the data record that preceded the first change in the data record is requested. By way of example, information is requested about each change (provided that it has not been reversed again) which precedes the first change in the data record and which the first data record does not contain.

In an embodiment, a third piece of information, which represents a third change, made by a communication device, in a data record to generate a third changed data record, and a third data change indicator associated with the third change are received, a check is performed to determine whether the third data change indicator matches the second data change indicator, and if the third data change indicator does match the second data change indicator then the second piece of information and the second data changed indicator are (e.g. again) sent to the communication device which made the third change.

Figure 3:
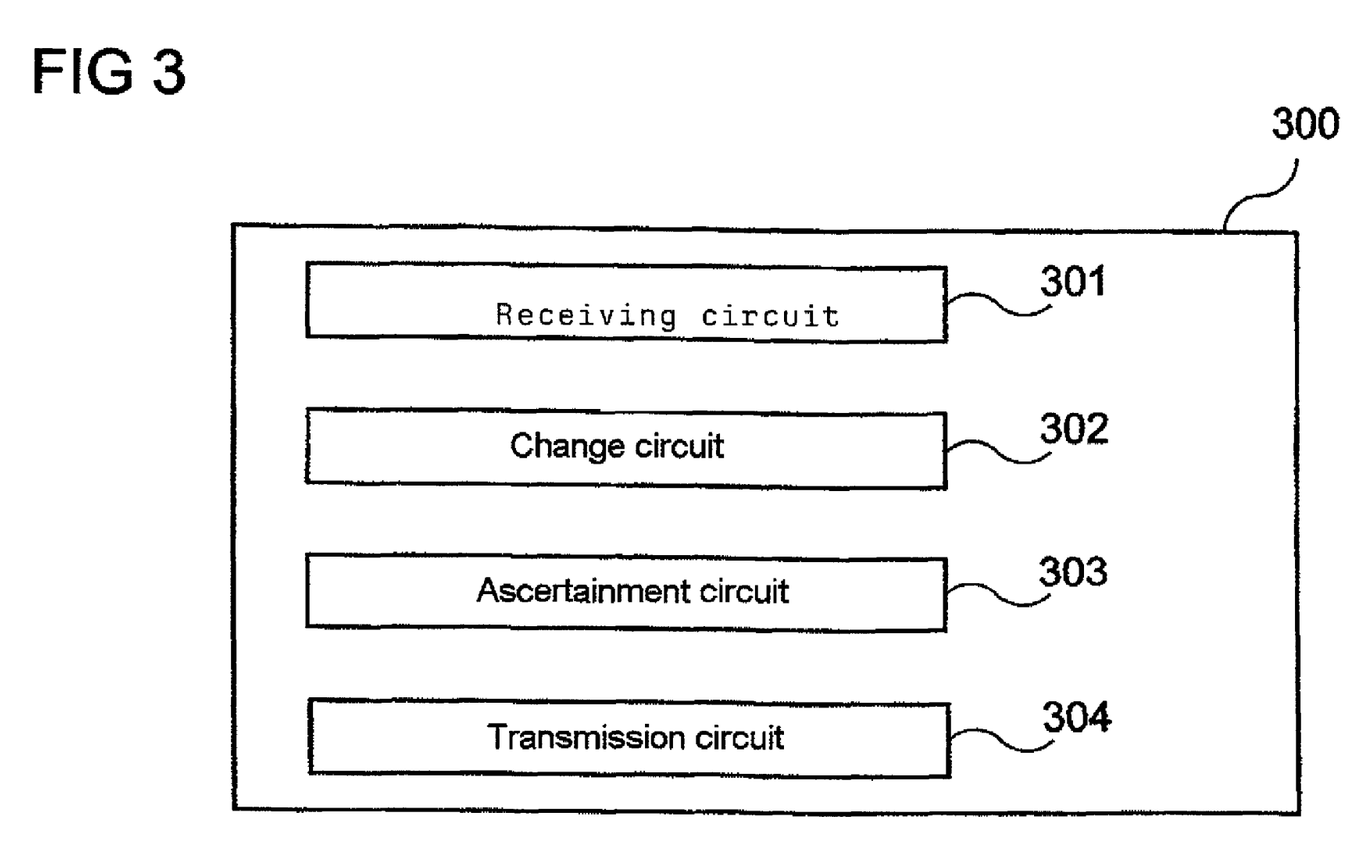
FIG. 3 shows a communication device in accordance with an embodiment.

The method described with reference to FIG. 2 is performed by a communication device, for example, as shown in FIG. 3.

FIG. 3 shows a communication device 300 in accordance with an embodiment.

The communication device 300 has a receiving circuit 301 which is configured to receive a first piece of information, which represents a first change in a data record to generate a first changed data record, and a first data change indicator associated with the first change in the data record.

In addition, the communication device 300 has a change circuit 302 which is configured to make a second change in the first changed data record to generate a second changed data record.

An ascertainment circuit 303 in the communication device 300 is configured to ascertain a second data change indicator on the basis of the first data change indicator.

A transmission circuit 304 in the communication device 300 is configured to send a second piece of information, which represents the second change in the first data record to generate the second changed data record, and the second data change indicator, for example to a further communication device which is intended to be informed about the changed data record for the purpose of synchronizing the data record between the communication device and the further communication device.

A memory which is used in various embodiments may be a volatile memory, for example a DRAM (Dynamic Random Access Memory), or a nonvolatile memory, for example a PROM (Programmable Read Only Memory), an EPROM (Erasable PROM), an EEPROM (Electrically Erasable PROM), or a flash memory, e.g. a floating gate memory, a charge trapping memory, and a MRAM (Magnetoresistive Random Access Memory) or a PCRAM (Phase Change Random Access Memory).

In various embodiments, a "circuit" may be understood to mean any device which implements a piece of logic, the logic being able to be either hardware, software, firmware or a combination of these. Hence, in various embodiments, a "circuit" may be a hardwired logic circuit or a programmable logic circuit, such as a programmable processor, e.g. a microprocessor (e.g. a CISC (Complex Instruction Set Computer) processor or a RISC (Reduced Instruction Set Computer) processor). A "circuit" may also be intended to be understood to be a piece of software implemented on a processor or a piece of software executed by a processor, e.g. a computer program, for example a computer program in programming code for a virtual machine, such as a Java computer program. In various embodiments, a "circuit" may be any type of implementation of the functions described below.

The communication device 300 also has a memory for storing an instance of the data record, for example.

In an embodiment, the communication device also has a comparison circuit which is configured to compare the first data change indicator with a stored data change indicator associated with the last change in the data record, and the ascertainment circuit is configured to take the comparison result as a basis for ascertaining whether a stored instance of the data record contains the first change in the data record.

In an embodiment, the receiving circuit 301 is configured to receive an identification, associated with the first change in the data record, for another communication device, and the ascertainment circuit 303 is configured to take the received identification as a basis for ascertaining whether the stored instance of the data record contains the first change in the data record.

The communication device 300 may also have a comparison circuit which is configured to compare the first data change indicator with a stored data change indicator associated with the last change in the data record and wherein the ascertainment circuit is configured to take the comparison result as a basis for ascertaining whether a stored instance of the data record contains a change in the data record which precedes the first change in the data record.

In an embodiment, the communication device also has a request circuit which is configured to request a piece of information which represents a change in the data record which preceded the first change in the data record.

The communication device 300 may furthermore have a memory for storing the second data change indicator as the data change indicator associated with the last change in the data record.

The text below explains an embodiment for which it is assumed that the communication devices 101 to 105 shown in FIG. 1 are communication devices in a conference communication system, for example a push-to-talk (PTT) communication system based on the OMA (Open Mobile Alliance) standard. By way of example, the first communication device 101 is a communication server and the other communication devices 102 to 105 are subscriber devices which are participating in a conference provided by the first communication device 101. In this case, the participating communication devices 102 to 105 do not communicate with one another directly, but rather by means of the central conference server, i.e. the first communication device 101.

In this implementation, four subscriber appliances 102 to 105 are participating in the conference. There may also be more or less communication devices participating in the conference, for example at least two communication devices.

In the embodiment which follows, it is assumed that a subscriber wishing to transmit communication data as part of the conference first of all requests the floor from the first communication device 101. By way of example, it may be necessary in a push-to-talk conference system for a user of a subscriber appliance who wishes to transmit voice data to operate a special key on his subscriber appliance in similar fashion to a walkie talkie, so that the communication right (in this ease the floor) is requested from the central server (i.e. the first communication device 101). By way of example, the user can transmit voice messages to the other subscriber devices (and hence the users thereof) only when the server 101 grants him the communication right. By way of example, the server grants the user the floor only if no other subscriber (i.e. no user of one or the other subscriber devices) currently has the floor. The allocation and management of the communication right is also called floor control.

When one of the subscriber devices 102 to 105 requests the floor in this embodiment and the floor is currently allocated, the floor request is stored in a queue (which is also called the floor queue) in the server 101.

The communication right can be automatically allocated by the server 101 or is allocated by a particular user, the moderator. In this implementation, it is assumed that the communication right is allocated by a moderator who uses one of the communication devices 102 to 105. The moderator allocates the communication right using the communication device 102 to 105 he is using (in other words the moderator terminal), which interchanges moderator messages with the server 101. So that the moderator can decide about the allocation of the communication right, the moderator (or the communication device 102 to 105 he is using) is notified of the state of the current communication rights request queue in one embodiment. Conversely, the server should also know the current state of the queue so that the server 101 can allocate the communication right in line with the queue.

In addition, in various embodiments, both the moderator and the server can modify the queue. By way of example, the moderator modifies the queue in order to allocate the communication right in a particular order (by re-sorting the queue as appropriate). The server 101 modifies the queue when a new communication rights request has been received and needs to be included in the queue, for example, or when a communication rights request disappears from the queue, for example because the communication right has been allocated as appropriate.

The queue, that is to say the statements of the communication devices 102 to 105 which are sent a communication rights request and the order thereof, for example, therefore forms a data record which needs to be synchronized between the server 101 and the communication device 102 to 105 of the moderator. When one of these two communication devices (server, moderator terminal) changes the state of the queue, the other communication device needs to be informed about this. In this implementation, as mentioned, either the communication device of the moderator or the server 101 can alter the queue (and hence the state of the queue).

Figure 4:
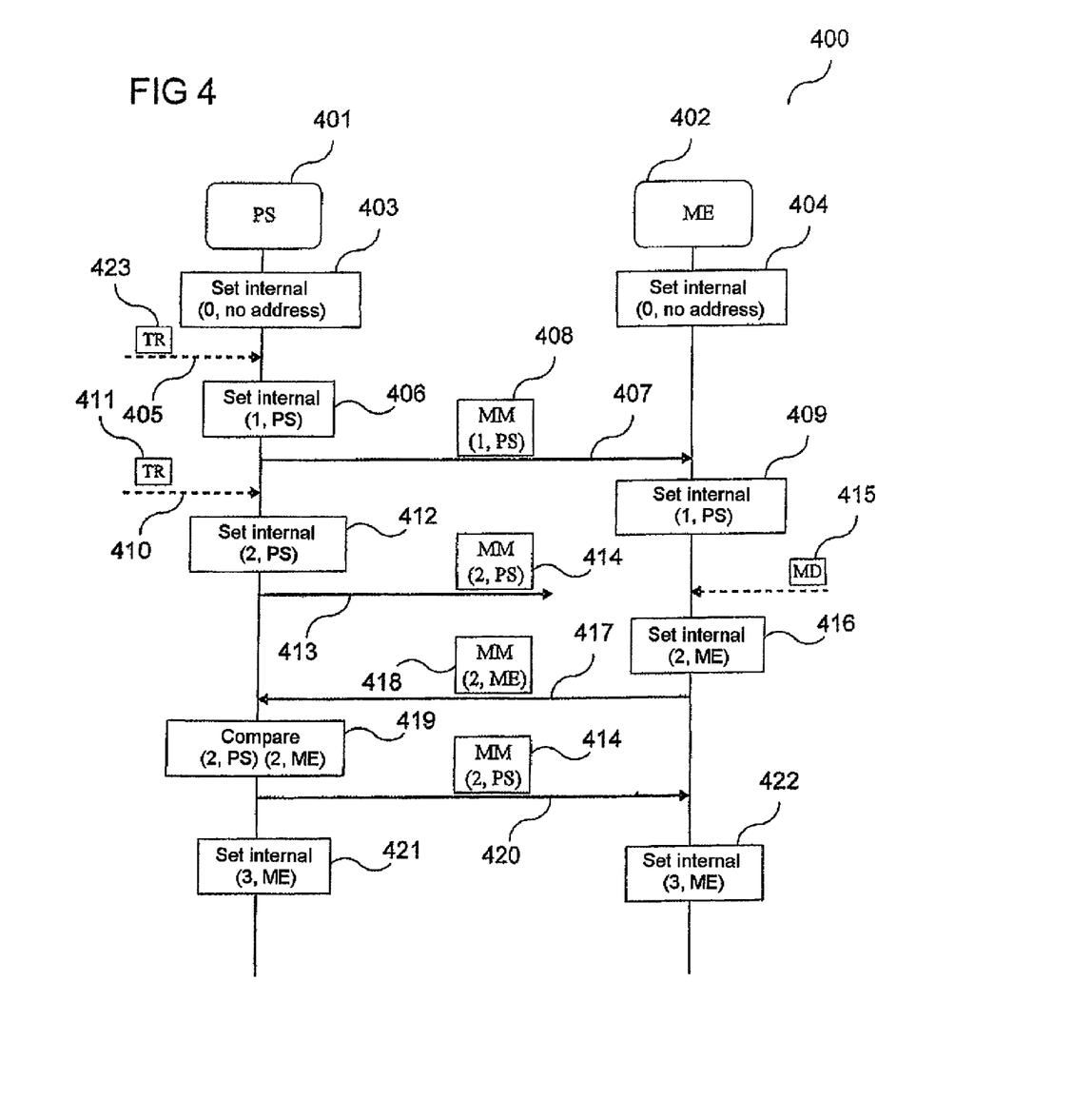
FIG. 4 shows a message flowchart in accordance with an embodiment.

An example of the synchronization of the queue between the server 101 and the communication device 102 to 105 which is used by the moderator is shown in FIG. 4.

FIG. 4 shows a message flowchart 400 in accordance with an embodiment.

The message flow shown takes place between a server computer 401, for example corresponding to the first communication device 101 in FIG. 1, for example a push-to-talk server, and a moderator terminal 402, for example one of the (second to fifth) communication devices 102 to 105 in FIG. 1.

It is assumed that a conference session has just been set up and is now starting, and accordingly the queues (in other words the instances of the shared queue) for communication rights requests both in the server computer 401 and in the moderator terminal 402 are empty. In 403, the server computer sets its internal change number to 0 and its internal change address to "no address" or "empty address". Similarly, in 404, the moderator terminal sets its internal change number to 0 and its internal change address to "no address".

It is assumed that the server computer 401 receives a first communication rights request 423 in 405 (denoted by TR for "Talk Request" in FIG. 4).

Next, in 406, the server computer increments its internal change number to 1 and its internal change address to its own address, since, in line with the first communication rights request 423, it itself adjusts the queue by entering the first communication rights request 423 into the queue.

In 407 the server computer 401 sends a first change statement 408 together with its internal change number (currently 1) and its internal change address (currently its own address) to the moderator terminal 402. The change statement contains the information regarding how the queue has changed in comparison with its previous version (in this case the empty queue with change number 0). The first change statement 408 is generated, by way of example, by virtue of the server computer ascertaining which elements of the queue have changed and producing a statement (as part of the first change statement 408) for each changed element. By way of example, the elements in this implementation are the positions in the queue, and the server computer 401 generates the statement for the currently last position in the queue that it now contains the first communication rights request 423 (whereas it was previously empty, for example).

After the moderator terminal 402 has received the first change statement 408 from the server computer 401, the moderator terminal compares the change number transmitted using the first change statement with its own internal change number in 409. Since in this case the received change number is the successor number for its internal change number (in this ease integer numbers are used for numbering, which means that 1 is the direct successor to 0), the moderator terminal 402 accepts the indicated change. The moderator terminal 402 takes the first change statement 408 as a basis for changing the state of the queue which is stored (i.e. its instance of the queue) and sets its internal change number to the received change number 1. Furthermore, the moderator terminal 402 stores the information that the current change number 1 has been allocated by the server computer 401 by setting its internal change address to the received change address, that is to say to the address of the server computer 401.

It is now assumed that the server computer 401 receives a second communication rights request 411 in 410. In 412, the server computer 401 stores the second communication rights request 411 in its instance of the queue and increments its internal change number to the value 2. In addition, the server computer 401 sets its internal change address to its own address, since in this case too it itself has made the change in the queue. In 413, the server computer 401 sends a second change statement 414 together with its current change number and its current change address to the moderator terminal 402. The second change statement 414 contains the information regarding how the queue has changed in comparison with the version which contains the change with change number 1, that is to say the information about the inclusion of the second communication rights request 411.

It is now assumed that the second change statement 414 is not received by the moderator terminal 402 on account of an unreliable communication link between the server computer 401 and the moderator terminal 402.

It is also assumed that the moderator decides in 415 that the first communication rights request 423 needs to be approved. For this reason, the moderator terminal removes the first communication rights request 423 from its instance of the queue in 416. Since the internal change number of the moderator terminal 402 is still at 1 (since the second change statement 414 has not been received), the moderator terminal 402 sets its internal change number to the subsequent value 2. In addition, the moderator terminal 402 sets its internal change address to its own address, since the last change in the queue was made by it itself.

In 417, the moderator terminal 402 sends a third change statement 418 about the change it has made in the queue to the server computer 401 together with its internal change number (2) and its internal change address (its own address).

In 419, the server computer 401 compares its internal change number with the change number received by the moderator terminal 402. Since both change numbers match (both are set to the value 2), the server computer 401 could assume that the version of the queue which it stores already contains the change indicated by the third change statement 418. However, the server computer 401 additionally compares the received change address with its internal change address. Since the internal change address of the server computer 401 is its own address and the received change address is that of the moderator terminal 402, the server computer 401 recognizes that the change in the queue specified by the third change statement 418 has not yet been taken into account by the server computer 401 and that the moderator terminal 402 has not received the second change statement 414.

In 420, the server computer 401 then sends the second change statement 414 with the change number 2 and the change address from itself to the moderator terminal 402 again. In 421 and 422, the server computer 401 and the moderator terminal 402 accordingly set their internal change numbers to 3 and the internal change addresses to the address of the moderator terminal 402.

Figure 5:
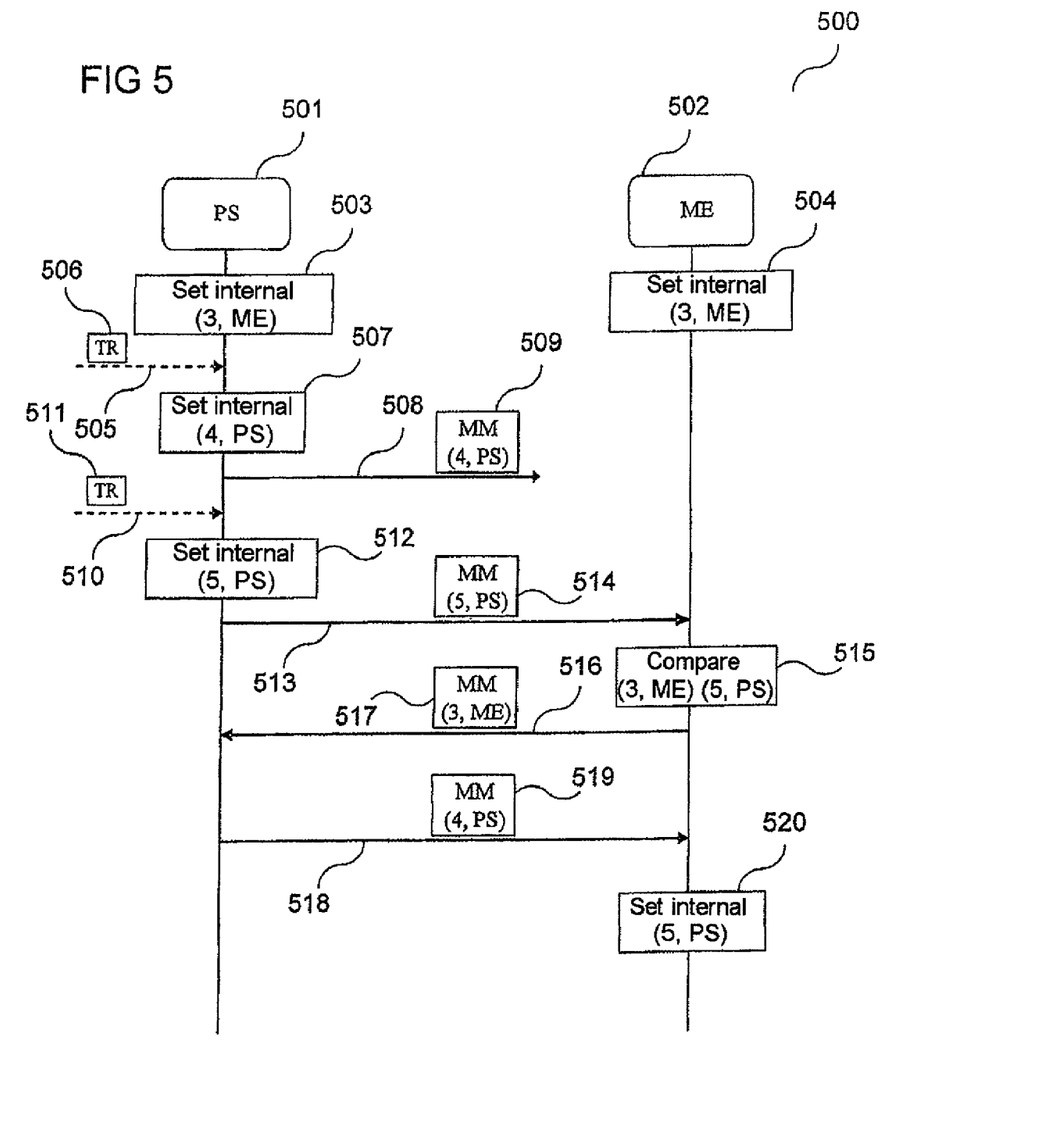
FIG. 5 shows a message flowchart in accordance with an embodiment.

An example of a further cycle in the synchronization between the server computer 401 and the moderator terminal 402 is shown in FIG. 5.

FIG. 5 shows a message flowchart 500 in accordance with an embodiment.

The message flow shown takes place in similar fashion to the message flow shown in FIG. 4 between a server computer 501 and a moderator terminal 502.

In corresponding fashion to 421 and 422 in FIG. 4, at the start of the cycle shown in FIG. 5 it is assumed that the server computer 501 has set its internal change number to the value 3 and its internal change address to the address of the moderator terminal 502 in 503 and that in 504 the moderator terminal has set its internal change number to the value 3 and its internal change address to the address of the moderator terminal 502.

It is now assumed that the server computer 501 receives a third communication rights request 506 in 505.

Accordingly, the server computer sets its internal change number to the value 4 and its internal change address to its own address in 507. In 508, the server computer 501 sends a fourth change statement 509 to the moderator terminal 502 with information about the change it has made in the queue (inclusion of the third communication rights request 506), the change number 4 and its own address as the change address.

It is assumed that the moderator terminal 502 does not receive the fourth change statement 509. In addition, it is assumed that the server computer 501 then receives a fourth communication rights request 511 in 510.

The server computer 501 inserts the fourth communication rights request 511 into its queue and in 512 accordingly sets its internal change number to the value 5 and its internal change address to its own address.

In addition, the server computer 501 transmits a fifth change statement 514 to the moderator terminal 502 in 513 with the information about the inclusion of the fourth communication rights request 511 in the queue, the change number 5 and the address of the server computer 501 as the change address.

In 515, the moderator terminal 502 compares the change number received by means of the fifth change statement 514 with its internally stored change number. Since the received change number (this is set to 5) differs from the internal change number (this is set to 3 on the basis of 504) by 2 and hence the internally stored change number is not the direct predecessor to the received change number, or in other words the internally stored change number is situated further away than directly before the received change number, the moderator terminal 502 recognizes that it has not received the fourth change statement 509.

Accordingly, the moderator terminal 502 uses a change request 517 to request the fourth change statement 509 from the server computer 501 in 516 by using the change request 517 to notify the server computer 501 of its last internally stored change number (which is set to 3).

The server computer then transmits the fourth change statement 519 to the moderator terminal 502 again in 518.

In 520, the moderator terminal 502 sets its internal change number to the value 5 and the change address to the address of the server computer 501 in line with the fifth change statement 514.

Besides use for push-to-talk communication systems, various embodiments can also be used for other communication systems, for example conference communication systems with moderated communication rights request queues. In addition, various embodiments cannot be used only for synchronizing queues, but rather can also be used for synchronizing other data, for example address information in the case of an address book application between communication devices or media data between communication devices, for example a portable electronic device for playing back media data (e.g. an MP3 player) and a computer with a music database.

By way of example, it is also possible for data to be requested from a communication network by a communication device (for example downloaded from the internet) and then synchronized with other communication devices, that is to say forwarded to other communication devices, for example.

Examples of communication devices involved in data synchronization are mobile electronic devices such as mobile radio subscriber devices, PDAs (Personal Digital Assistants), MP3 players, laptop computers or communication devices operated at a fixed location, such as server computers or (desktop) personal computers. A server computer which is involved provides the application, for example, in the course of which the data synchronization is performed, for example a conference, as in the exemplary embodiment described above.

By way of example, an embodiment is used for synchronizing electronic calendars which are stored on different communication appliances of different users, for example for aligning school calendars (with lessons which have been cancelled or moved at short notice) between teachers and pupils.

Various embodiments can also be used for aligning received e-mails between a computer and a mobile appliance. Similarly, an embodiment can be used to synchronize a database which is stored on a computer and a mobile device, for example a drugs database for field employees, etc.

In line with an embodiment, collaborative work on a shared document, that is to say the editing of a document by a plurality of editors, is made possible at the same time by virtue of the document being synchronized between the electronic devices (for example computers) used by the editors after a change.

By way of example, an embodiment is used for forwarding disaster messages from mobile device to mobile device, for example in areas without a reliable communication network infrastructure, e.g. in areas with poor mobile radio network coverage.

In addition, various embodiments can be used not only for data synchronization between two communication devices but also for synchronization between more than two communication devices. An appropriate architecture is shown in FIG. 6.

Figure 6:
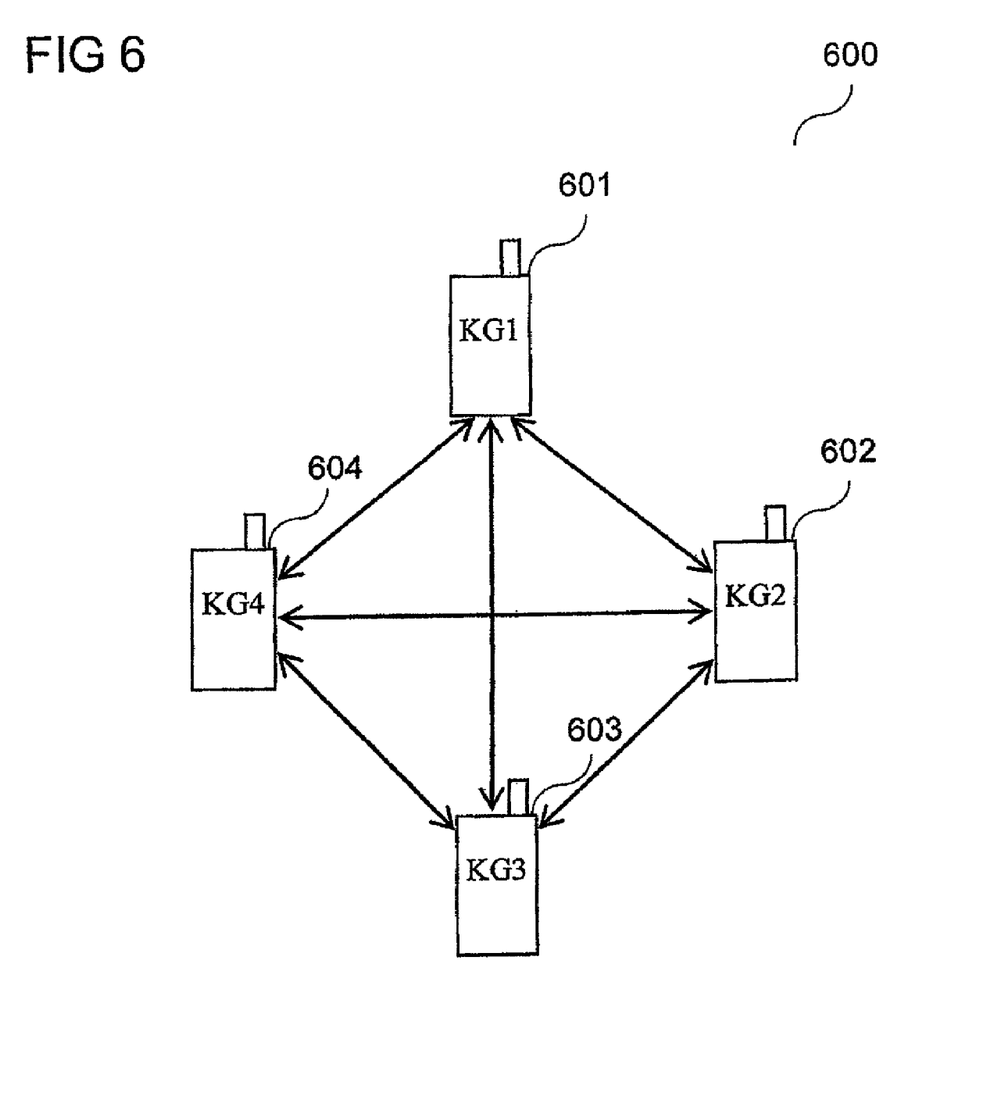
FIG. 6 shows a communication arrangement in accordance with an embodiment.

FIG. 6 shows a communication arrangement 600 in accordance with an embodiment.

The communication arrangement 600 has a first communication device 601, a second communication device 602, a third communication device 603 and a fourth communication device 604. In this implementation, all communication devices 601 to 604 are coupled in pairs by means of communication links. In the event of data which are to be synchronized being changed by one of the communication devices 601 to 604, the communication device 601 to 604 changing the data transmits an appropriate change statement to a plurality of, for example to all, other communication devices 601 to 604.

Various embodiments can also be used for data synchronization between communication devices which are not connected directly, as is the case in the communication arrangement shown in FIG. 6, but rather are at least to some extent connected only indirectly. Such an architecture is shown in FIG. 7.

Figure 7:
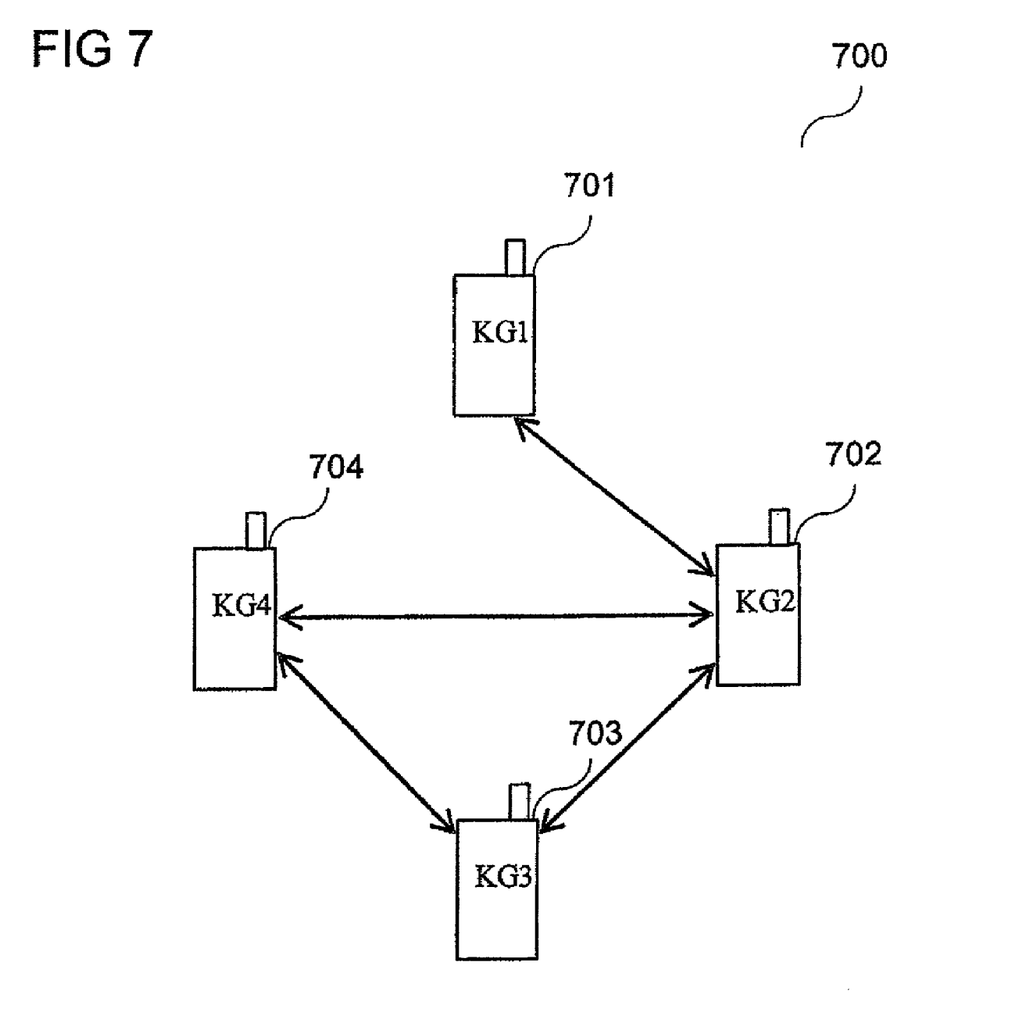
FIG. 7 shows a communication arrangement in accordance with an embodiment.

FIG. 7 shows a communication arrangement 700 in accordance with an embodiment.

The communication arrangement 700 has a first communication device 701, a second communication device 702, a third communication device 703 and a fourth communication device 704.

In this implementation, the first communication device 701 and the third communication device 703 are not coupled directly by means of a communication link, but rather are coupled only by means of the second communication device 702, for example. For the purpose of data synchronization between the communication devices 701 to 704, a change statement, for example, is forwarded to a communication device, which is not directly connected by means of a communication link to the communication device which made the change, from an intermediate communication device, for example one which is connected directly to the communication device by means of a communication link. The forwarding is performed automatically, for example, always following reception of a change statement. In order to avoid infinite forwarding of a change statement, provision is made, by way of example, for a change statement to be provided with a forwarding counter (also called a hop counter), which is set to a particular initial value when the change statement is generated and which is decremented when the change statement is forwarded. Once the forwarding counter has reached a prescribed minimum value, for example for the value 0, the change statement is no longer forwarded.

In another embodiment, a communication device does not forward a change statement if the change number which is transmitted with the change statement corresponds to the internal change number of the communication device. In another embodiment, a change statement is not forwarded automatically, but rather only when a missing data change statement is requested by a communication device.

If change statements are forwarded only when a request for the change statements is present, provision is made, by way of example, for further change statements after the first requested change statement to be automatically forwarded to the communication devices which have previously requested the forwarding.

Various embodiments can also be used for network architectures with a central communication device, as shown in FIG. 1. In this case, the central communication device 101 forwards change statements to the other communication devices 102 to 105, for example. Such a network architecture can be regarded as a special form of an architecture with indirectly connected communication devices.

In an embodiment, provision is made for the communication devices to transmit their respective internal change number to the other communication devices periodically. The other communication devices compare the received change numbers with their internally stored change numbers. If a received change number in a communication device does not match the internally stored change number or if a received change address does not match the internally stored change address, the communication device requests the missing change statement from another communication device or sends a change statement to another communication device which has not yet received the change statement.

In the case of data synchronization between two communication devices, instead of the change address it is also possible to store and transmit the direction of the transmission of the last change statement (this can be done using a single bit). In the case of two communication devices, one embodiment dispenses with the transmission of this information, since the communication devices know whether they have sent the last change statement themselves or have received it from the other communication device.

In line with an embodiment, a two-way handshake protocol may be used for communication between the communication devices, for example the SIP (Session Initiation Protocol). In this case, a communication device can transmit a missing change statement using the response message from a dialogue, for example. An appropriate example is shown in FIG. 8.

Figure 8:
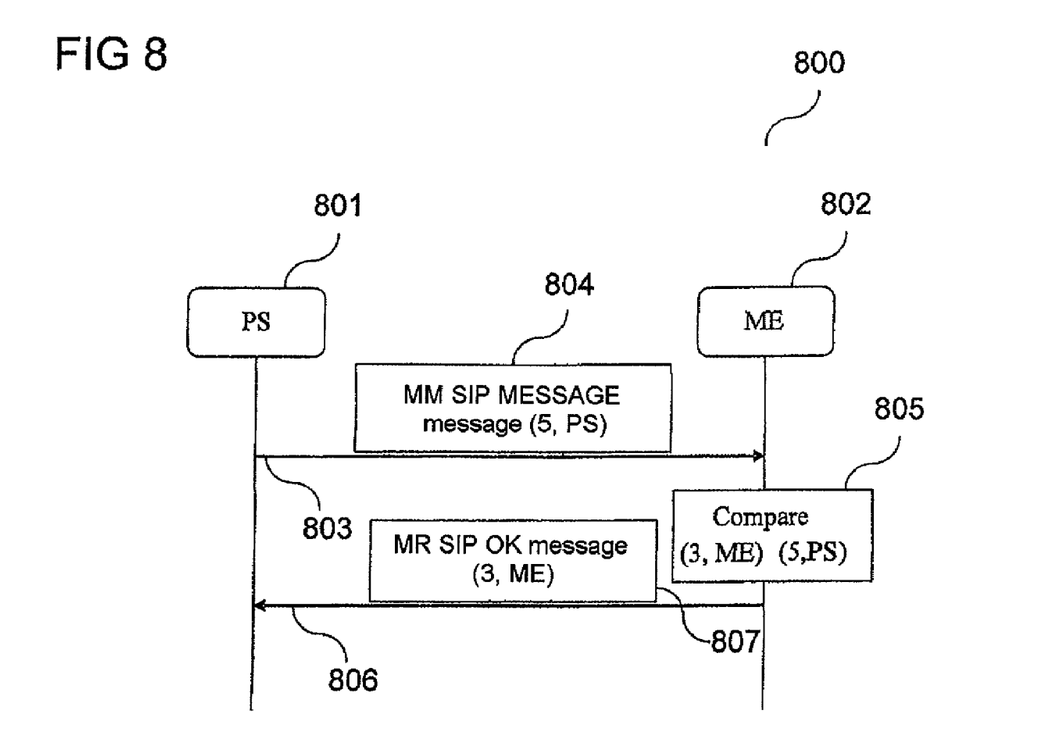
FIG. 8 shows a message flowchart in accordance with an embodiment.

FIG. 8 shows a message flowchart 800 in accordance with an embodiment.

In similar fashion to FIG. 4, the message flow shown takes place between a server computer 801 and a moderator terminal 802.

It is assumed that the moderator terminal 802 has stored the internal change number 3 and its own address as change address.

It is now assumed that the server computer 801 transmits a first SIP message 804 to the moderator terminal 802 in 803 with a change statement, for example in what is known as the body of the SIP message, and the change number 5 and its own address as change address.

In 805, the moderator terminal 802 compares the received change number with the internal change number and establishes that it has not received the change statement regarding the change with the change number 4.

In 806, the moderator terminal 802 uses the response message from the SIP-MESSAGE dialogue, an SIP-OK message 807 for requesting the change statement regarding the data change with the change number 4, by stating the change number 3 and its own address as the change address in the SIP-OK message 807.

To transmit the messages with the change statements, it is possible to use IETF protocols, for example, i.e. protocols from the IETF (Internet Engineering Task Force). By way of example, the SIP protocol, the RTP (Real Time Protocol) protocol, the RTCP (Real Time Control Protocol) protocol, the BFCP (Binary Floor Control Protocol) protocol, the http (Hypertext Transport Protocol) protocol, the XCAP (XML (Extensible Markup Language) Configuration Access Protocol) protocol, the Xpath (XML Path Language) protocol or the ftp (File Transfer Protocol) protocol can be used.

For the purpose of transmitting change statements about the change in a communication rights queue, the RTCP protocol, the BFCP protocol or the SIP protocol can be used, for example.

In line with an embodiment, a method for sending data is provided which involves:
  storing an instance of a data record;
  receiving a specification for a first change in the data record and an identification for the first change in the data record;
  the changing of the instance of the data record in line with the first change in the data record if the instance of the data record does not yet contain the first change in the data record;
  generating a specification for a second change in the data record;
  generating an identification for the second change in the data record on the basis of the identification of the first change in the data record;
  the changing of the instance of the data record in line with the second change in the data record; and
  the sending of the specification of the second change in the data record and of the identification of the second change in the data record.

In line with various embodiments, a communication device may be provided which may include:
  a memory configured to store an instance of a data record;
  a receiving circuit which is configured to receive a specification for a first change in the data record and an identification for the change in the data record;
  a change circuit which is configured to change the instance of the data record in line with the first change in the data record if the instance of the data record does not yet contain the first change in the data record;
  a generating circuit which is configured to generate a specification for a second change in the data record and an identification for the second change in the data record on the basis of the identification of the first change in the data record, wherein the change circuit is configured to change the instance of the data record in line with the second change in the data record; and
  a transmission circuit which is configured to send the specification of the second change in the data record and the identification of the second change in the data record.

A computer program according to an embodiment includes a computer program product which, when executed by a computer, causes the computer to perform a method for sending data, wherein the method includes:
  receiving a first piece of information, which represents a first change in a data record to generate a first changed data record, and a first data change indicator associated with the first change in the data record;
  making, a second change in the first changed data record to generate a second changed data record;
  ascertaining, a second data change indicator based on the first data change indicator; and
  sending a second piece of information, which represents the second change in the first changed data record to generate the second changed data record, and the second data change indicator.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A method for sending data, comprising:
  receiving, by a communication device, a first piece of information, which represents a first change in a data record to generate a first changed data record, and of a first data change indicator associated with the first change in the data record;
  making, by the communication device, a second change in the first changed data record to generate a second changed data record;
  ascertaining a second data change indicator based on the first data change indicator by the communication device;
  sending, by the communication device, a second piece of information, which represents the second change in the first changed data record to generate the second changed data record, and of the second data change indicator, to a second communication device;
  receiving, by the communication device, a third piece of information which represents a third change in a data record, made by the second communication device, to generate a third changed data record and of a third data change indicator associated with the third change in the data record,
  checking, by the communication device, whether the third data change indicator matches the second data change indicator or a data change indicator that has been generated prior to the second data change indicator for a previous change in the data record, and
  sending, by the communication device, the second piece of information and of the second data change indicator to the second communication device which has made the third change in the data record if the third data change indicator matches the second data change indicator or a data change indicator that has been generated prior to the second data change indicator for a previous change in the data record.

2. The method as claimed in claim 1,
  wherein the first piece of information is the first changed data record.

3. The method as claimed in claim 1,
  wherein the second piece of information is the second changed data record.

4. The method as claimed in claim 1,
  wherein the first data change indicator and the second data change indicator are counter values from a succession of counter values and wherein the second data change indicator is the counter value which follows the first data change indicator.

5. The method as claimed in claim 1,
wherein the second data change indicator is ascertained from the first data change indicator by means of an arithmetic operation.

6. The method as claimed in claim 5,
wherein the first data change indicator and the second data change indicator are integer numbers and the second data change indicator is the first data change indicator increased by a prescribed value.

7. The method as claimed in claim 1,
wherein the first piece of information sent by a communication device and the first data change indicator are received and the second piece of information and the second data change indicator are sent to the second communication device.

8. The method as claimed in claim 1,
wherein the data record has a plurality of data elements; and
wherein the method further comprises:
ascertaining which data elements in the second changed data record have changed in comparison with the first changed data record, and
generating, for each changed data element, a data element change statement, which specifies the change in the changed data element, as part of the second piece of information.

9. The method as claimed in claim 1, further comprising:
storing the second data change indicator as the data change indicator associated with the last change in the data record.

10. The method as claimed in claim 1, further comprising:
comparing the first data change indicator with a stored data change indicator associated with the last change in the data record, and
ascertaining, on the basis of the comparison result, whether a stored instance of the data record contains the first change in the data record.

11. The method as claimed in claim 1, further comprising:
receiving an identification, associated with the first change in the data record, for a communication device, and
ascertaining, on the basis of the received identification, whether a stored instance of the data record contains the first change in the data record.

12. The method as claimed in claim 1, further comprising:
assigning an identification, associated with a communication device which makes the second change in the data record, to the second piece of information; and
sending the identification.

13. The method as claimed in claim 1, further comprising:
changing of a stored instance of the data record on the basis of the first change in the data record and on the basis of the second change in the data record.

14. The method as claimed in claim 1, further comprising:
comparing the first data change indicator with a stored data change indicator associated with the last change in the data record, and
ascertaining, on the basis of the comparison result, of whether a stored instance of the data record contains a change in the data record which preceded the first change in the data record.

15. The method as claimed in claim 14, further comprising:
requesting a piece of information which represents a change in the data record that precedes the first change in the data record if the stored instance of the data record does not contain a change in the data record which precedes the first change in the data record.

16. A communication device, comprising:
a receiving circuit which is configured to receive a first piece of information, which represents a first change in a data record to generate a first changed data record, and a first data change indicator associated with the first change in the data record;
a change circuit which is configured to make a second change in the first changed data record to produce a second changed data record;
an ascertainment circuit which is configured to ascertain a second data change indicator based on the first data change indicator;
a transmission circuit which is configured to send a second piece of information, which represents the second change in the first changed data record to generate the second changed data record, and the second data change indicator, to a second communication device;
a receiving circuit which is configured to receive a third piece of information which represents a third change in a data record, made by the second communication device, to generate a third changed data record and of a third data change indicator associated with the third change in the data record;
a checking circuit which is configured to check whether the third data change indicator matches the second data change indicator or a data change indicator that has been generated prior to the second data change indicator for a previous change in the data record; and
a transmission circuit configured to send the second piece of information and of the second data change indicator to the second communication device which has made the third change in the data record if the third data change indicator matches the second data change indicator or a data change indicator that has been generated prior to the second data change indicator for a previous change in the data record.

17. The communication device as claimed in claim 16, further comprising:
a memory configured to store an instance of the data record.

18. The communication device as claimed in claim 17, further comprising:
a comparing circuit which is configured to compare the first data change indicator with a stored data change indicator associated with the last change in the data record,
wherein the ascertainment circuit is configured to take the comparison result as a basis for ascertaining whether a stored instance of the data record contains the first change in the data record.

19. The communication device as claimed in claim 17,
wherein the receiving circuit is configured to receive an identification, associated with the first change in the data record, for another communication device, and
wherein the ascertainment circuit is configured to take the received identification as a basis for ascertaining whether the stored instance of the data record contains the first change in the data record.

20. The communication device as claimed in claim 17, further comprising:
a comparing circuit which is configured to compare the first data change indicator with a stored data change indicator associated with the last change in the data record, wherein the ascertainment circuit is configured to take the comparison result as a basis for ascertaining whether a stored instance of the data record contains a change in the data record that precedes the first change in the data record.

21. The communication device as claimed in claim 20, further comprising:
a request circuit which is configured to request a piece of information which represents a change in the data record that precedes the first change in the data record.

22. A computer program product which, when executed by a computer, causes the computer to perform a method for sending data, wherein the method comprises:
receiving, through the computer, a first piece of information, which represents a first change in a data record to generate a first changed data record, and a first data change indicator associated with the first change in the data record;
making, through the computer, a second change in the first changed data record to generate a second changed data record;
ascertaining, through the computer, a second data change indicator based on the first data change indicator;
sending, through the computer, a second piece of information, which represents the second change in the first changed data record to generate the second changed data record, and the second data change indicator, to a second computer;
receiving, through the computer, a third piece of information which represents a third change in a data record, made by the second computer, to generate a third changed data record and of a third data change indicator associated with the third change in the data record,
checking, through the computer, whether the third data change indicator matches the second data change indicator or a data change indicator that has been generated prior to the second data change indicator for a previous change in the data record, and
sending, through the computer, the second piece of information and of the second data change indicator if the third data change indicator matches the second data change indicator or a data change indicator that has been generated prior to the second data change indicator for a previous change in the data record, to the second computer.

23. A method for sending data, the method comprising:
storing, by a communication device, an instance of a data record;
receiving, by the communication device, a specification for a first change in the data record and an identification for the first change in the data record;
changing, by the communication device, the instance of the data record in line with the first change in the data record if the instance of the data record does not yet contain the first change;
generating a specification for a second change in the data record by the communication device;
generating an identification for the second change in the data record based on the identification of the first change in the data record by the communication device;
changing the instance of the data record in line with the second change in the data record by the communication device; and sending the specification of the second change in the data record and the identification of the second change in the data record by the communication device to a second communication device;
receiving, by the communication device, a specification for a third change in the data record, made by the second communication device, and an identification for the third change in the data record;
checking, whether the identification for the third change in the data record matches the identification for the second change in the data record or an identification for a change in the data record that has been generated prior to the identification for the second change for a previous change in the data record, and
sending, the specification for a second change in the data record and of the identification for the second change in the data record if the identification for the third change in the data record matches the identification for the second change in the data record or an identification for a change in the data record that has been generated prior to the identification for the second change for a previous change in the data record, to the second communication device.

24. A communication device, comprising:
a memory configured to store an instance of a data record;
a receiving circuit which is configured to receive a specification for a first change in the data record and an identification for the change in the data record;
a change circuit which is configured to change the instance of the data record in line with the first change in the data record if the instance of the data record does not yet contain the first change in the data record;
a generating circuit which is configured to generate a specification for a second change in the data record and an identification for the second change in the data record based on the identification of the first change in the data record, wherein the change circuit is configured to change the instance of the data record in line with the second change in the data record;
a transmission circuit which is configured to send the specification of the second change in the data record and the identification of the second change in the data record to a second communication device;
a receiving circuit configured to receive a specification for a third change in the data record, made by the second communication device, and an identification for the third change in the data record;
a checking circuit configured to check whether the identification for the third change in the data record matches the identification for the second change in the data record or an identification for a change in the data record that has been generated prior to the identification for the second change for a previous change in the data record, and
a transmission circuit configured to send the specification for a second change in the data record and of the identification for the second change in the data record if the identification for the third change in the data record matches the identification for the second change in the data record or an identification for a change in the data record that has been generated prior to the identification for the second change for a previous change in the data record, to the second communication device.

25. A method for sending data, comprising:
storing, by a communication device, a first piece of information, which represents a first change in a data record to generate a first changed data record, and of a first data change indicator associated with the first change in the data record;

making, by the communication device, a second change in the first changed data record to generate a second changed data record;

ascertaining a second data change indicator based on the first data change indicator by the communication device;

sending, by the communication device, a second piece of information, which represents the second change in the first changed data record to generate the second changed data record, and of the second data change indicator, to a second communication device;

sending, by the communication device, a third piece of information which represents a third change in the second changed data record, to generate a third changed data record and of a third data change indicator associated with the third change in the data record, to the second communication device, sending, by the communication device, the second piece of information, which represents the second change in the first changed data record to generate the second changed data record, and of the second data change indicator, when notified of an identification stored in the further communication device, wherein a comparison of the third data change indicator with the identification stored in the further communication device has indicated that the identification stored in the further communication device is not the direct predecessor to the third data change indicator, to the second communication device.

26. A communication device, comprising:

a memory configured to store a first piece of information, which represents a first change in a data record to generate a first changed data record, and of a first data change indicator associated with the first change in the data record;

a generating circuit configured to generate a second change in the first changed data record to generate a second changed data record;

an ascertainment circuit configured to ascertain a second data change indicator based on the first data change indicator by the communication device;

a transmission circuit configured to send a second piece of information, which represents the second change in the first changed data record to generate the second changed data record, and of the second data change indicator, to a second communication device;

a transmission circuit configured to send a third piece of information which represents a third change in the second changed data record, to generate a third changed data record and of a third data change indicator associated with the third change in the data record, to the second communication device, a transmission circuit configured to send the second piece of information, which represents the second change in the first changed data record to generate the second changed data record, and of the second data change indicator, when notified of an identification stored in a further communication device, wherein a comparison of the third data change indicator with the identification stored in the further communication device has indicated that the identification stored in the further communication device is not the direct predecessor to the third data change indicator, to the second communication device.

27. A method for sending data, comprising:

storing, by a communication device, a first piece of information, which represents a first change in a data record to generate a first changed data record, and of a first data change indicator associated with the first change in the data record;

receiving, by the communication device, a further change in the first changed data record, made by a second communication device, to generate a further changed data record and a further data change indicator;

comparing, by the communication device, of the further data change indicator and the first data change indicator stored in the communication device;

sending, by the communication device, the first data change indicator, when the first data change indicator is not the direct predecessor to the further data change indicator, to the second communication device.

28. A communication device, comprising:

a memory configured to store a first piece of information, which represents a first change in a data record to generate a first changed data record, and of a first data change indicator associated with the first change in the data record;

a receiving circuit configured to receive a further change in the first changed data record to generate a further changed data record, made by a second communication device, and a further data change indicator;

a comparison circuit configured to compare the further data change indicator and the first data change indicator stored in the communication device;

a transmission circuit configured to send the first data change indicator, when the first data change indicator is not the direct predecessor to the further data change indicator, to the second communication device.

* * * * *